(12) United States Patent
Lee et al.

(10) Patent No.: US 8,440,105 B2
(45) Date of Patent: May 14, 2013

(54) PHOSPHORS AND WHITE LIGHT EMITTING DEVICES INCLUDING SAME

(75) Inventors: Jae-ho Lee, Seoul (KR); Young-sic Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 494 days.

(21) Appl. No.: 12/757,355

(22) Filed: Apr. 9, 2010

(65) Prior Publication Data

US 2010/0259161 A1    Oct. 14, 2010

(30) Foreign Application Priority Data

Apr. 9, 2009   (KR) .................. 10-2009-0030957

(51) Int. Cl.
*H01L 33/00* (2010.01)
*C09K 11/54* (2006.01)
*C09K 11/55* (2006.01)
*C09K 11/59* (2006.01)
*C09K 11/60* (2006.01)
*C09K 11/64* (2006.01)
*C09K 11/66* (2006.01)

(52) U.S. Cl.
USPC ............ 252/301.4 F; 252/301.6 F; 313/503; 257/98

(58) Field of Classification Search ............ 252/301.4 F, 252/301.6 F; 313/503; 257/98
See application file for complete search history.

(56) References Cited

U.S. PATENT DOCUMENTS

2007/0158614 A1* 7/2007 Seto et al. ............... 252/301.4 F
2008/0123324 A1* 5/2008 Daicho et al. ................... 362/84

FOREIGN PATENT DOCUMENTS

| CN | 101134895 B | | 5/2011 |
| JP | 2002003836 A | | 6/2000 |
| JP | 2002003837 A | | 6/2000 |
| JP | 2005-213288 | * | 8/2005 |
| JP | 2005213288 A | | 8/2005 |
| WO | WO2004041963 A1 | | 5/2004 |

* cited by examiner

*Primary Examiner* — Carol M Koslow
(74) *Attorney, Agent, or Firm* — Cantor Colburn LLP

(57) ABSTRACT

A phosphor represented by Formula 1:

$$(A_{1-(a+b)}Eu_aLn_b)_{1-x}(B_{1-c}Mn_c)_2Al_{(6+b-2x)}Si_{(9-b+2x)}O_{30}$$  Formula 1 wherein A includes at least one element selected from the group consisting of Ca, Sr and Ba, Ln includes at least one metal selected from the group consisting of a trivalent rare earth metal, B includes at least one element selected from the group consisting of Mg, Zn, Ge and Co, a is greater than 0 and equal to or less than about 0.5, b is greater than 0 and equal to or less than about 0.25, c is greater than 0 and less than about 0.8, and x is 0 to about 0.2. Also a white light emitting device including the phosphor.

11 Claims, 7 Drawing Sheets

PHOSPHORS AND WHITE LIGHT EMITTING DEVICES INCLUDING SAME

CROSS-REFERENCE TO RELATED APPLICATION

This application claims priority to Korean Patent Application No. 10-2009-0030957, filed on Apr. 9, 2009, and all the benefits accruing therefrom under 35 U.S.C. §119, the content of which in its entirety is herein incorporated by reference.

BACKGROUND

1. Field

One or more embodiments relate to a phosphor and a white light emitting device including the same, and more particularly, to a phosphor having a wide emission peak in a visible wavelength region and a white light emitting device including the same.

2. Description of the Related Art

Commonly used illumination devices include fluorescent lamps and incandescent lamps. However, fluorescent lamps include mercury (Hg), which causes environmental problems. In addition, such illumination devices have short lifetimes and low efficiency and thus, low power saving efficiency. Therefore there remains a need for white light emitting illumination devices having improved efficiency.

White light emitting devices operate in various manners. For example, ultraviolet light emitting diodes ("UV LEDs") are used as a light source to excite red, green and blue phosphors in order to generate white light, wherein red, green and blue are three primary colors of light. In some devices, blue LEDs are used as a light source to excite red and green phosphors in order to generate white light. In other devices, blue LEDs are used as a light source to excite a yellow phosphor in order to generate white light.

To convert UV light into white light having a high color rendering index ("CRI"), an emission spectrum of a phosphor is desirably similar to that of sunlight in a visible wavelength region of 380 to 780 nanometers (nm). To provide such an emission spectrum, three kinds of phosphors, such as a red, a green and a blue phosphor may be used, and the color temperature of the white light may be controlled by changing the ratio of the three phosphors. However, when three different phosphors are used, more factors are desirably considered and thus it is difficult to generate uniform white light using three phosphors. For example, when one or two phosphors are used, phosphor quality may be more easily controlled than when three phosphors are used. Thus, when one or two phosphors are used in a white light emitting device, the color coordinate deviations are reduced.

SUMMARY

One or more embodiments include a phosphor that has a wide emission peak in a visible light region.

One or more embodiments include a method of manufacturing the phosphor.

One or more embodiments include a white light emitting device that includes the phosphor and has excellent color rendering characteristics.

Additional aspects will be set forth in the description which follows.

According to one or more embodiments, a phosphor is represented by Formula 1:

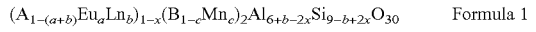  Formula 1 wherein A includes at least one element selected from the group consisting of Ca, Sr and Ba, Ln includes at least one metal selected from the group consisting of a trivalent rare earth metal, B includes at least one element selected from the group consisting of Mg, Zn, Ge and Co, a is greater than 0 and equal to or less than about 0.5, b is 0 to about 0.25, c is greater than 0 and less than about 0.8, and x is 0 to about 0.2.

A 6-coordinate atomic radius of B may be about 0.75 Å to about 0.95 Å.

When excited, the phosphor may have an emission wavelength of about 400 to about 750 nanometers (nm), about 430 to about 700 nm, or about 460 to about 630 nm.

The phosphor may have at least two emission peaks, and the quantity:

$$I_b/(I_b+I_r)$$

may be greater than or equal to about 0.1 and less than or equal to about 0.9, wherein $I_b$ represents a blue light maximum peak intensity and $I_r$ represents a red light maximum peak intensity.

According to one or more embodiments, a white light emitting device includes: a light emitting diode; and a phosphor represented by Formula 1:

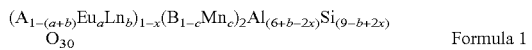  Formula 1 wherein A includes at least one element selected from the group consisting of Ca, Sr and Ba, Ln includes at least one metal selected from the group consisting of a trivalent rare earth metal, B includes at least one element selected from the group consisting of Mg, Zn, Ge and Co, and a is greater than 0 and about 0.5, b is 0 to about 0.25, c is greater than 0 and less than about 0.8, and x is 0 to about 0.2.

The white light emitting device may further include a green phosphor having an emission peak at a wavelength of about 500 to about 600 nm.

The green phosphor may include at least one phosphor selected from the group consisting of $(Ba,Sr,Ca)_2SiO_4:Eu^{2+}$; $Ba_2MgSi_2O_7:Eu^{2+}$; $Ba_2ZnSi_2O_7:Eu^{2+}$; $BaAl_2O_4:Eu^{2+}$; $SrAl_2O_4:Eu^{2+}$; $BaMgAl_{10}O_{17}:Eu^{2+}$, $Mn^{2+}$ and $BaMg_2Al_{16}O_{27}:Eu^{2+}$, $Mn^{2+}$.

Also disclosed is a white light emitting device, wherein the white light emitting device is a traffic light, a light source for a communications device, a backlight of a display device or an illumination source.

In an embodiment, the light emitting diode may be a UV light diode.

BRIEF DESCRIPTION OF THE DRAWINGS

The above and other aspects, features and advantages of this disclosure will become apparent and more readily appreciated from the following description of the embodiments, taken in conjunction with the accompanying drawings in which.

DETAILED DESCRIPTION

Figure 1:
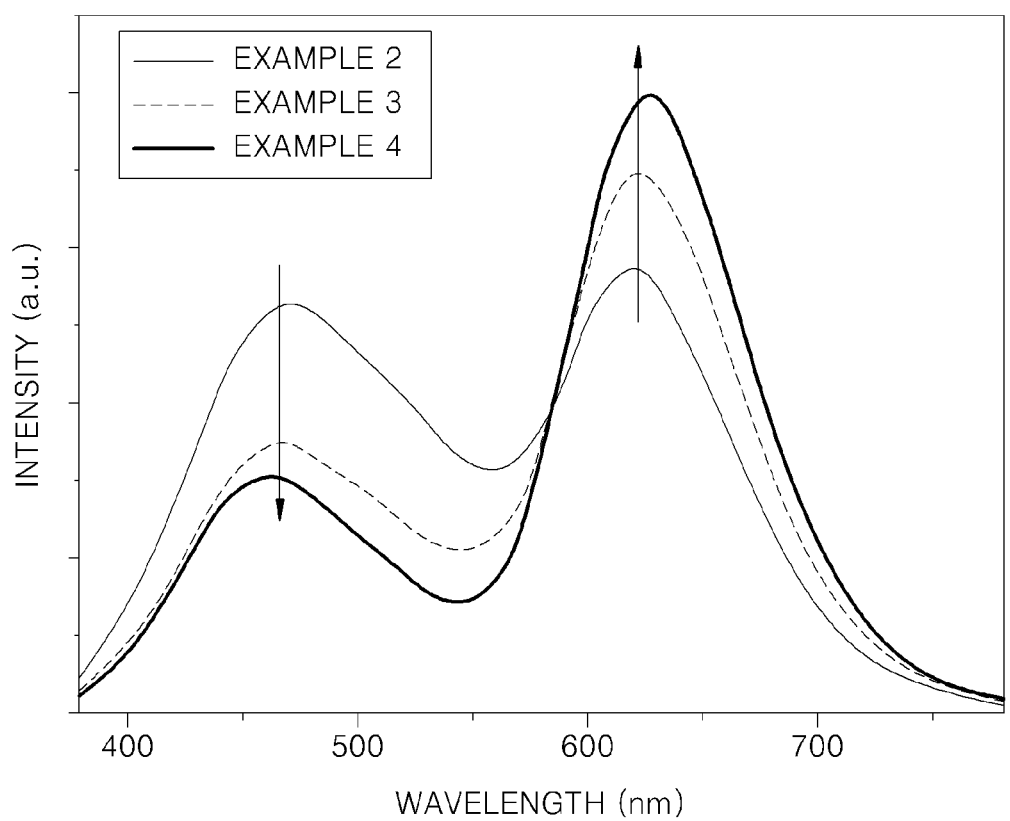
FIG. 1 is a graph of intensity (arbitrary units) versus wavelength (nanometers) illustrating photoluminescence ("PL") spectra of phosphors manufactured according to Examples 2 through 4, wherein the phosphors are excited by light having a wavelength of 365 nm.

Reference will now be made in detail to embodiments, examples of which are illustrated in the accompanying drawings. In this regard, the embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a phosphor according to an embodiment and a white light emitting device including the same will be described in further detail.

A phosphor according to an embodiment may be represented by Formula 1:

$$(A_{1-(a+b)}Eu_aLn_b)_{1-x}(B_{1-c}Mn_c)_2Al_{6+b-2x}Si_{9-b+2x}O_{30} \quad \text{Formula 1}$$

wherein A comprises at least one element selected from the group consisting of Ca, Sr and Ba, Ln comprises at least one metal selected from the group consisting of trivalent rare earth metals, B comprises at least one element selected from the group consisting of Mg, Zn, Ge and Co, and a is greater than 0 and equal to or less than about 0.5, b is 0 to about 0.25, c is greater than 0 and less than about 0.8, and x is 0 to about 0.2.

As used herein, a "trivalent rare earth metal" is a metal comprising at least one element selected from the group consisting of lanthanum, cerium, praseodymium, neodymium, promethium, samarium, europium, gadolinium, terbium, dysprosium, holmium, erbium, thulium, ytterbium, and lutetium.

The phosphor according to an embodiment may have an osumilite structure. However, the phosphor may have any other crystal structure so long as the desirable features, advantages or aspects of the phosphor are not substantially degraded. Although an osumilite-type crystal structure has a hexagonal symmetry, the crystal structure of the phosphor may not be limited thereto as long as the desirable features, advantages or aspects are not substantially degraded. For example, the crystal structure of the phosphor may include a monoclinic crystal structure or triclinic crystal structure, thus the crystal structure may have a lower degree of symmetry than the hexagonal crystal structure.

Examples of materials having an osumilite-type crystal structure include Ba-osumilite ($BaMg_2Al_6Si_9O_{30}$) and Sr-osumilite ($SrMg_2Al_6Si_9O_{30}$), which are aluminum silicate-based minerals. In the osumilite-type crystal structure, 12-coordinate Ba/Sr and 6-coordinate Mg have a high degree of symmetry in the hexagonal structure and thus a Ba/Sr (II) site and a Mg (II) site are substantially crystallographically equivalent. Thus, the Ba/Sr site may be substitutable with Eu (II), and the Mg site may be substitutable with Mn (II). Thus, in an embodiment, Eu (II) may enable blue emission and also, due to an energy transfer thereof, 6-coordinate Mn (II) may emit red light. Thus, by changing the amounts of Eu (II) and Mn (II) in the phosphor or a ratio of Eu (II) to Mn (II) in the phosphor, when the phosphor is used alone or together with other phosphor, the color temperature of white light emitted by a white light emitting device including the phosphor may be controlled.

The osumilite-type crystal structure has a high density and thus is less affected by humidity and oxygen, and also has thermal stability. In the osumilite-type crystal structure, in an embodiment wherein a site in which four-valent Si and tri-valent Al co-exist, when an activator that is not bi-valent is doped (e.g., added), a charge balance may be controlled by adjusting a ratio of Si to Al. In an embodiment, when at least two elements selected from the group consisting of Ba, Sr and Ca co-exist, the dimension of a unit cell is changed and thus a peak wavelength may be selected.

In Formula 1, a denotes the amount of europium (Eu) substituted with respect to A. In an embodiment, a may be greater than 0 and equal to or less than about 0.5, specifically greater than 0 and equal to or less than about 0.3, more specifically greater than about 0.1 and equal to or less than about 0.2. If a is greater than about 0.5, a luminescent efficiency may not be further increased with respect to the high concentration of Eu.

In Formula 1, c denotes the amount of manganese (Mn) substituted with respect to B. In an embodiment, c may be greater than 0 and less than about 0.8, specifically greater than 0 and equal to or less than about 0.6, more specifically greater than about 0.1 and less than about 0.5. If c is greater than 0.8, the concentration of Mn (II) may be too high, a concentration-induced luminescence extinction may occur and an Mn (II)-induced luminescence may not occur. In addition, when a phosphor is sintered in a manufacturing process, a phosphor precursor mixture powder may melt and adhere to the bottom of a crucible, thereby lowering the yield of the phosphor. In Formula 1, x represents a ratio of the number of all the atomic sites to the number of atomic sites that are not occupied in annular sites of the osumilite-type crystal structure. In the annular sites, at least one atom selected from the group consisting of Ba, Ca and Sr exist in an occupiable atomic site. At the occupiable atom site, the atom may exist or a pore may be formed. In Formula 1, x may be 0 to about 0.2, specifically about 0.1 to about 0.15, more specifically about 0.05 to about 0.1.

In Formula 1, Ln is a co-activator with respect to Eu, and comprises at least one metal selected from the group consisting of a trivalent rare earth metal, such as terbium, dysprosium or cerium. In Formula 1, b denotes the amount of the co-activator substituted with respect to A, and $0 \leq b \leq 0.25$, specifically $0.001 \leq b \leq 0.2$, more specifically $0.01 \leq b \leq 0.1$. Since these atoms have co-activating effects, the atoms are useful to change or increase the emission wavelength of the phosphor in a wide range.

In Formula 1, for B, a 6-coordinate ionic radius may be about 0.65 to about 1 Å, specifically about 0.75 to about 0.95 Å, more specifically about 0.85 Å.

According to the composition of metal ions, the phosphor absorbs light having a wavelength of about 260 to about 400 nm, specifically about 270 to about 360 nm, more specifically about 290 to about 340 nm and emits visible light having a peak wavelength of about 400 to about 750 nm, specifically about 430 to about 700 nm, more specifically about 460 to about 630 nm. Thus, since the phosphor has a wide emission peak in a visible light region, the phosphor alone, or together with a small amount of green phosphor, may be used in UV light-emitting diodes, and thus, a white light emitting device having excellent color rendering characteristics and color reproducibility may be provided.

While not wanting to be bound by theory, it is believed that because Ba and/or Sr, which is substitutable with Eu (II), enabling blue luminescence, and Mg, which is substitutable with Mn (II), enabling red luminescence, co-exist, and because a stable crystal structure such as osumilite is used, the emission range is wider as it includes the blue through red regions. In addition, by using the phosphor alone, or together with a green-based phosphor, a UV-derived white light source may be provided.

The photoluminesence ("PL") spectra of the phosphor may have two or more peaks. For example, two peaks may exist in regions corresponding to blue and red wavelength ranges, respectively. In this regard, a ratio of a blue light maximum peak intensity ("$I_b$") to a red light maximum peak intensity ("$I_r$") may satisfy the inequality 1, below.

$$0.1 \leq I_b/(I_b+I_r) \leq 0.9 \quad \text{Inequality 1}$$

The blue light maximum peak intensity ("$I_b$") may be about 440 to about 485 nm, specifically about 450 to about 475 nm, more specifically about 460 to about 465 nm and the red light maximum peak intensity ("$I_r$") may be about 600 to about 650 nm, specifically about 610 to about 640 nm, more specifically about 620 to about 630 nm.

The phosphor may be manufactured using a phosphor precursor according to a known method, such a heat melting method, a solidifying method, a wetting method, a spraying thermolysis method or the like.

For example, in an embodiment of a method of manufacturing the phosphor, precursor compounds containing elements of the phosphor are measured in amounts corresponding to a composition ratio of constituent elements of a final product and then mixed. The mixture of the phosphor precursor compounds may be sintered at a temperature of about 1000 to about 1600° C., specifically about 1100 to about 1500° C., more specifically about 1200 to about 1400° C. for about 1 to about 12 hours, specifically about 2 to about 10 hours, more specifically about 3 to about 8 hours under a reducing atmosphere or an inert atmosphere. Thus, a sintered product of the target phosphor is formed. During the sintering, a reaction promotion agent such as $AlF_3$, $MgF_2$, LiF, NaF, or the like or a combination thereof may optionally be used as long as the desirable features, aspects or advantages of the disclosed phosphor are not substantially degraded, so as to lower the sintering temperature.

Then, in one or more embodiments, the sintered product of the target phosphor may be milled or classified.

A white light emitting device according to an embodiment includes a light emitting diode ("LED") and the phosphor.

The LED may be an ultraviolet ("UV") LED, and a peak wavelength of an excitation light source may be about 250 to about 400 nm, specifically about 260 to about 390 nm, more specifically about 270 to about 360 nm.

An emission spectrum of the phosphor may have a peak at a wavelength of about 400 to about 750 nm, specifically about 430 to about 700 nm, more specifically about 460 to about 630 nm.

The white light emitting device may further include a green phosphor having an emission peak at a wavelength of about 500 to about 600 nm.

Examples of the green phosphor include $(Ba,Sr,Ca)_2SiO_4$:$Eu^{2+}$; $Sr_2SiO_4$:$Eu^{2+}$; $Ba_2MgSi_2O_7$:$Eu^{2+}$; $Ba_2ZnSi_2O_7$:$Eu^{2+}$; $BaAl_2O_4$:$Eu^{2+}$; $SrAl_2O_4$:$Eu^{2+}$; $BaMgAl_{10}O_{17}$:$Eu^{2+}$, $Mn^{2+}$; $BaMg_2Al_{16}O_{27}$:$Eu^{2+}$,$Mn^{2+}$ and combinations thereof. The white light emitting device may comprise at least one of these green phosphors.

The white light emitting device generates white light having a high color rendering index ("CRI") and thus, it may be used for medical purposes, food exhibitions, museums, galleries, in high-quality illumination devices for daily use or the like.

In addition to the white light emitting device described above, the phosphor may also be used in a lamp, such as a mercury (Hg) lamp or a xenon (Xe) lamp or in a self-emission liquid crystal display device.

Hereinafter, one or more embodiments will be further described in detail with reference to the following examples. However, these examples are not intended to limit the scope of the claims.

EXAMPLE 1

$BaCO_3$, $Mg(OH)_2$, $Al_2O_3$, $SiO_2$, $Eu_2O_3$ and $MnCO_3$, which are phosphor precursors, were measured in the amounts shown in Table 1 below and then, sufficiently mixed using an agate mortar to obtain a precursor mixture. The precursor mixture was placed in an alumina crucible and sintered under a reducing atmosphere of $H_2/N_2$ (5:95 volume ratio) at a temperature of 1300° C. for 6 hours. The temperature was increased at 400° C. per hour. After the sintering, the reducing atmosphere was maintained until the sintered product was cooled to room temperature. Then, the sintered product was milled.

EXAMPLE 2

A phosphor was synthesized in the same manner as in Example 1, except that the composition ratio of the phosphor precursors was changed as shown in Table 1.

EXAMPLE 3

A phosphor was synthesized in the same manner as in Example 1, except that the composition ratio of the phosphor precursors shown in Table 1 was used.

EXAMPLE 4

A phosphor was synthesized in the same manner as in Example 1, except that the composition ratio of the phosphor precursors shown in Table 1 was used.

COMPARATIVE EXAMPLE 1

A phosphor was synthesized in the same manner as in Example 1, except that the composition ratio of the phosphor precursors shown in Table 1 was used.

(II) located in the 6-coordinate Mg site and the energy of excited Eu (II) is transferred to Mn (II).

Figure 2:
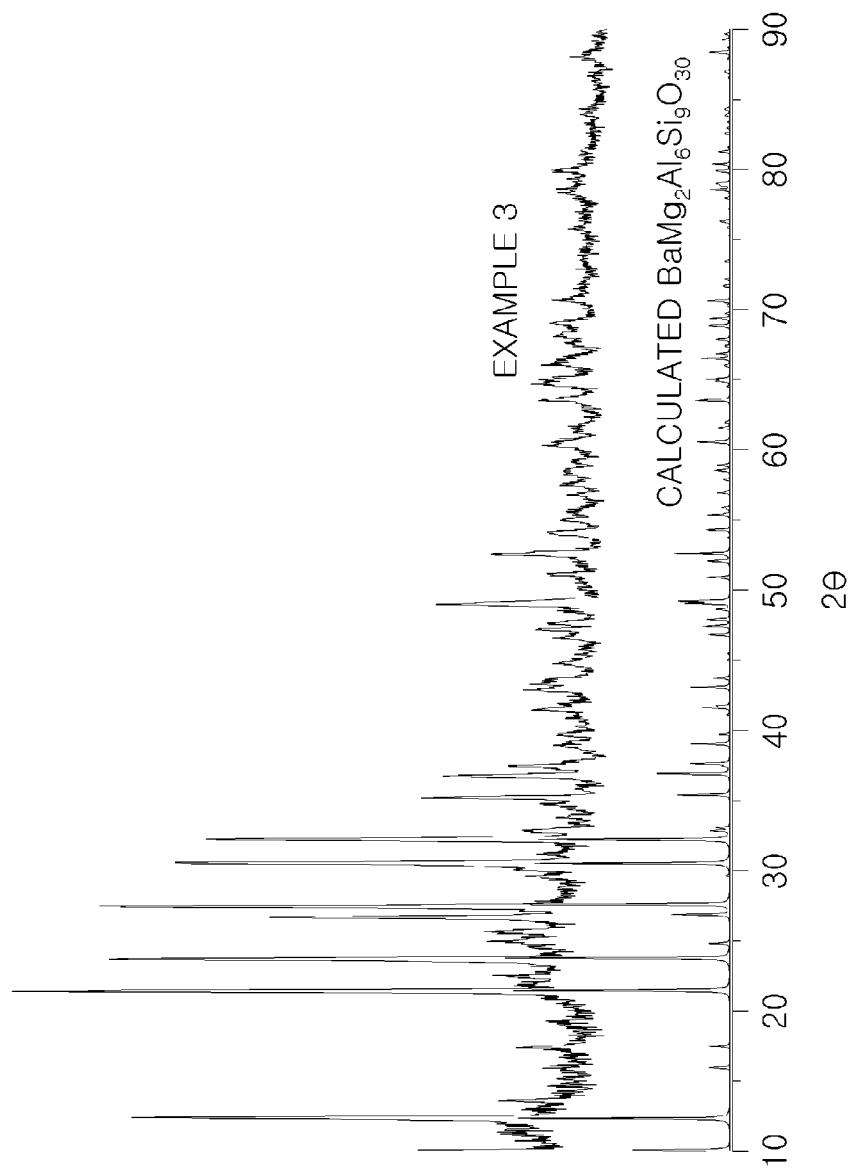
FIG. 2 is a graph of illustrating X-ray diffraction intensity (counts) versus deflection angle (degrees two-theta) of a phosphor manufactured according to Example 3 and a calculated X-ray diffraction pattern for $BaMg_2Al_6Si_9O_{30}$.

FIG. 2 shows a powder X-ray diffraction pattern of the phosphor manufactured according to Example 3 and a calculated X-ray diffraction pattern for a reference material, $BaMg_2Al_6Si_9O_{30}$. The pattern for $BaMg_2Al_6Si_9O_{30}$ was calculated using single crystal atom coordinates disclosed by W. Winter et al. for synthesized Ba-osumilite (W. Winter, T. Armbruster, and C. Lengauer, *Eur. J. Mineral.* 1995, 7, 277-286). Referring to FIG. 2, powder X-ray diffraction results for the phosphor synthesized according to Example 3 show that the phosphor has an osumilite crystal structure.

To identify an effective excitation wavelength of a phosphor, an excitation spectrum was measured at a wavelength of 627 nm.

Figure 3:
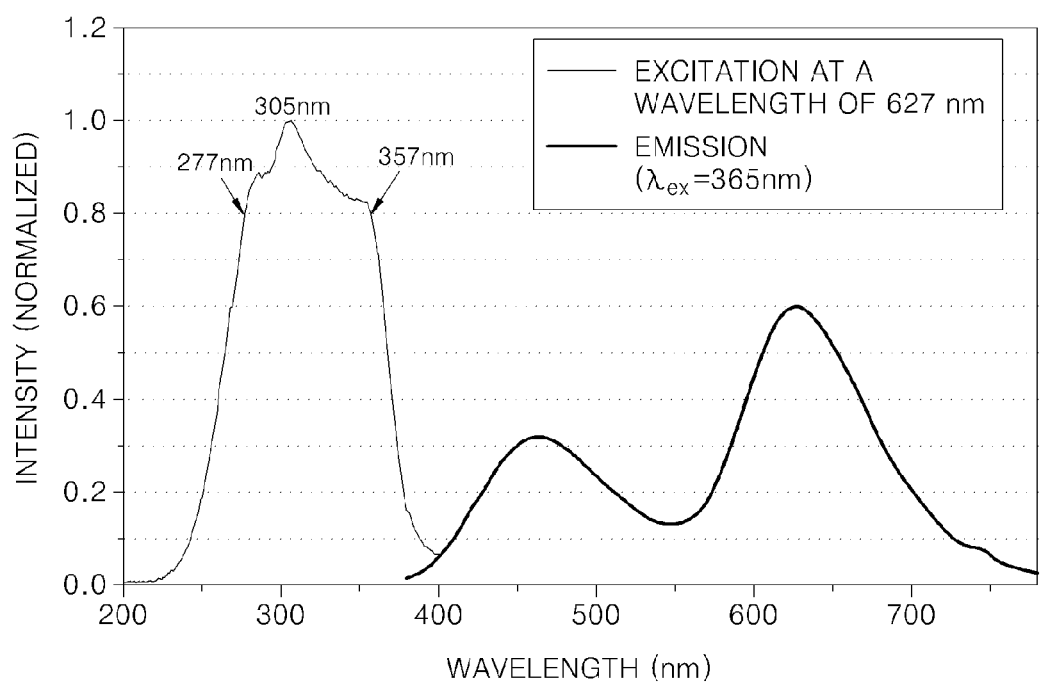
FIG. 3 is a graph of normalized intensity versus wavelength (nanometers) illustrating an excitation spectrum using a measurement wavelength of 627 nm and a photoluminesence ("PL") spectrum of a phosphor manufactured according to Example 3, wherein the phosphor is excited by light having a wavelength of 365 nm.

FIG. 3 shows an excitation spectrum using a measuring wavelength of 627 nm and a PL spectrum of the phosphor manufactured according to Example 3, wherein the phosphor is excited by light having a wavelength of 365 nm. Referring to FIG. 3, when measured at a wavelength of 627 nm, the phosphor had the highest efficiency when excited by light of a wavelength of 305 nm, and when UV rays having a wavelength in the range of about 277 to about 357 nm were used, the phosphor's efficiency was 80% or more of the maximum efficiency of the phosphor. Thus, when a white light source is manufactured using the phosphor, it is seen that high luminescent efficiency is obtained when the wavelength of an excitation light is in the range of about 270 to about 360 nm.

Figure 4:
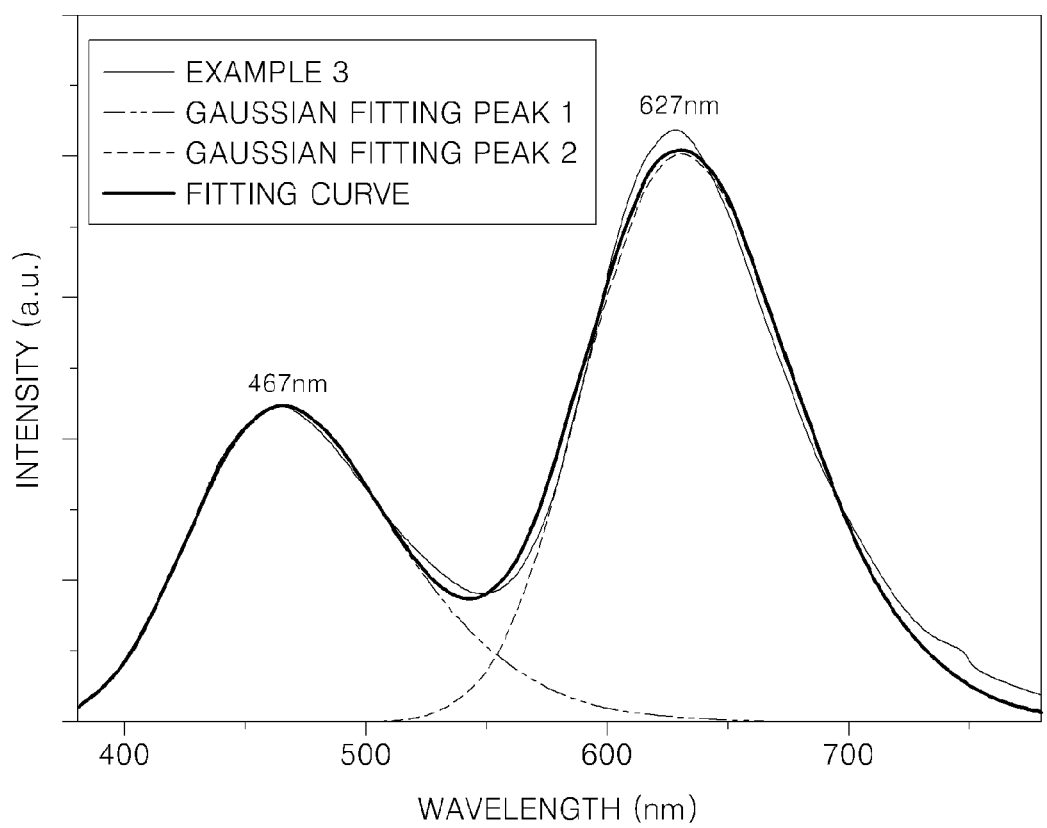
FIG. 4 is a graph of intensity (arbitrary units) versus wavelength (nanometers) illustrating a PL spectrum and fitted (i.e., calculated) emission peak curves of a phosphor manufactured in accordance with Example 3.
Figure 5A:
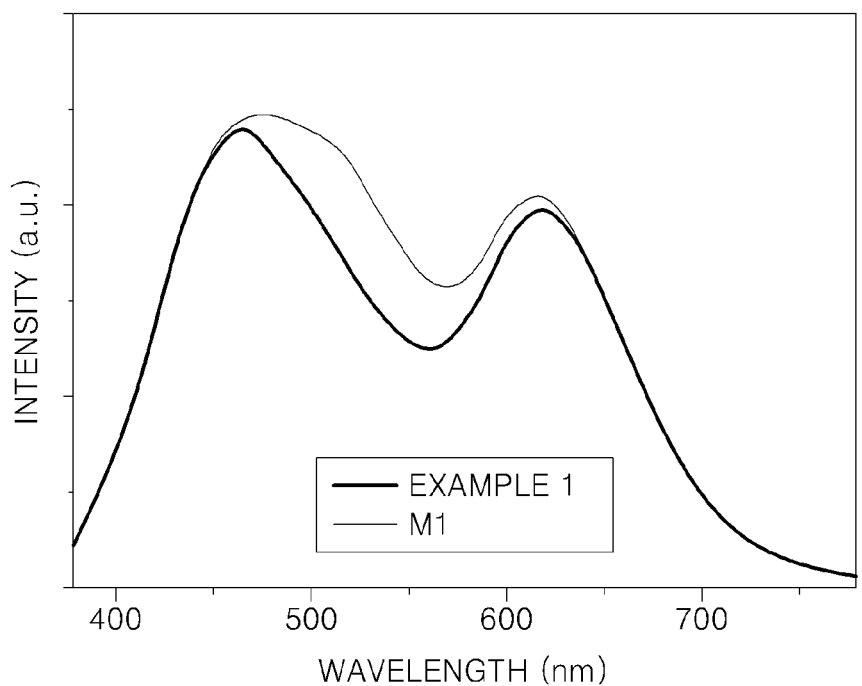
FIGS. 5A through 5D are graphs of intensity (arbitrary units) versus wavelength (nanometers) illustrating mixed simulation spectra obtained by mixing the PL spectra of the phosphors manufactured in accordance with Examples 1 to 4 and a PL spectrum of $SrAl_2O_4$:Eu phosphor.
Figure 5B:
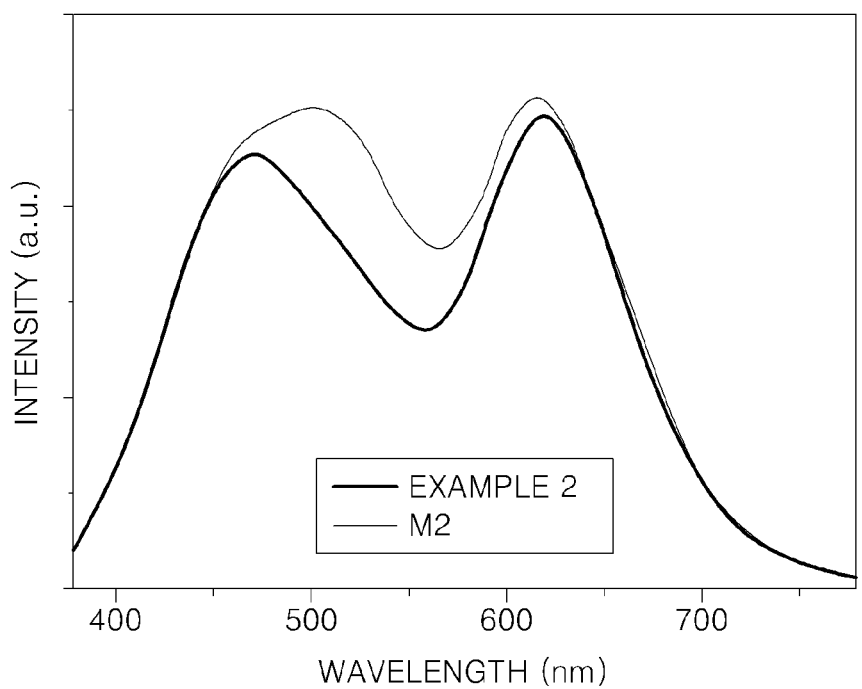
Figure 5C:
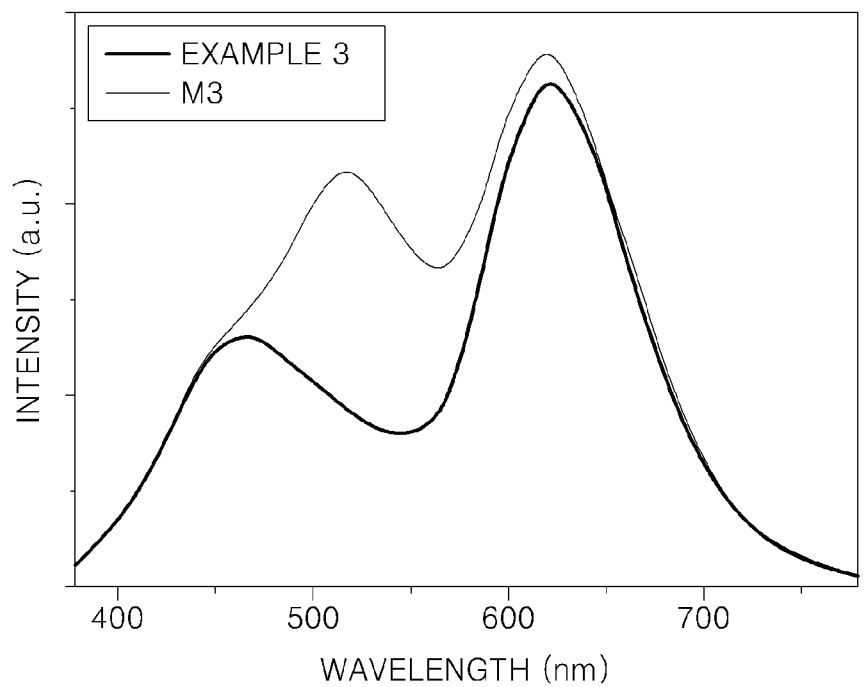
Figure 5D:
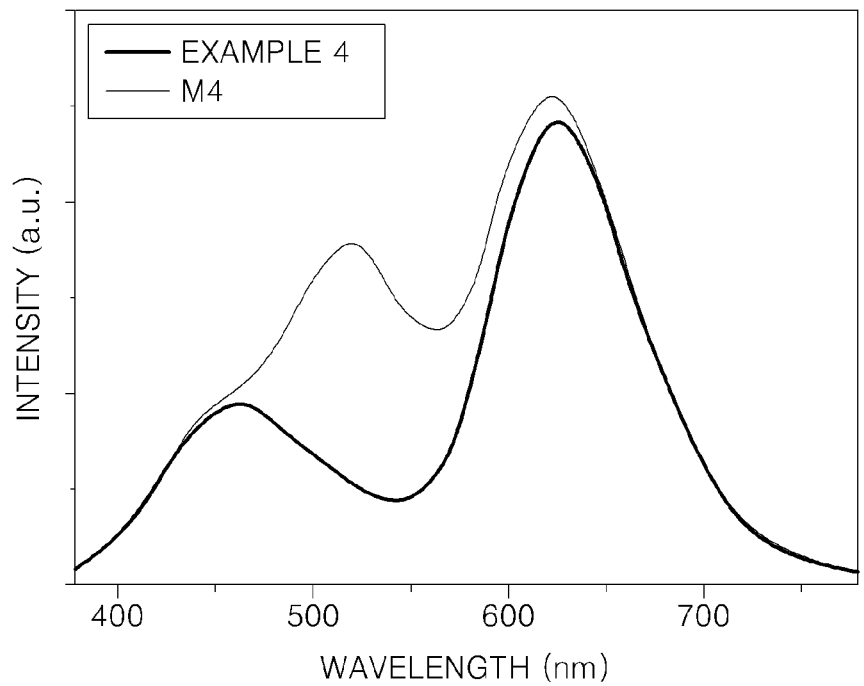

FIG. 4 shows a PL spectrum and fitted emission peak curves for the phosphor manufactured according to Example 3. Crystal fields that affect light emitting ions are changed according to the number of oxygen ions binding to light emitting ions of a phosphor, and their binding structures. The changed crystal field affects an emission wavelength. Thus when identical light emitting ions are substituted in the same crystal are exposed to a different crystallographic environment, a combination of various emission peaks may be observed. Referring to FIG. 4, it is observed that the phosphor manufactured according to Example 3 has a high-degree crystal symmetry. Since all Ba/Sr sites in the phosphor crystal have the same crystallographic environment, a single emission peak having a peak at a wavelength of 437 nm appears due to Eu (II) substituted at Ba/Sr sites. In addition, since Mg sites also have the same crystallographic environment, Mn

TABLE 1

| | Component (mole percent ("%")) | | | | | | |
| --- | --- | --- | --- | --- | --- | --- | --- |
| | $BaCO_3$ | $Mg(OH)_2$ | $Al_2O_3$ (% Al) | $SiO_2$ | $Eu_2O_3$ (% Eu) | $MnCO_3$ | Composition |
| Example 1 | 94.5 | 182 | 600 | 900 | 5.5 | 18 | $(Ba_{0.945}Eu_{0.055})(Mg_{0.91}Mn_{0.09})_2Al_6Si_9O_{30}$ |
| Example 2 | 91.8 | 182 | 600 | 900 | 8.2 | 18 | $(Ba_{0.918}Eu_{0.082})(Mg_{0.91}Mn_{0.09})_2Al_6Si_9O_{30}$ |
| Example 3 | 91.8 | 164 | 600 | 900 | 8.2 | 36 | $(Ba_{0.918}Eu_{0.082})(Mg_{0.82}Mn_{0.18})_2Al_6Si_9O_{30}$ |
| Example 4 | 91.8 | 146 | 600 | 900 | 8.2 | 54 | $(Ba_{0.918}Eu_{0.082})(Mg_{0.73}Mn_{0.27})_2Al_6Si_9O_{30}$ |
| Comparative Example 1 | 91.8 | 200 | 600 | 900 | 8.2 | — | $(Ba_{0.918}Eu_{0.082})Mg_2Al_6Si_9O_{30}$ |

FIG. 1 shows photoluminesence ("PL") spectra of the phosphors manufactured according to Examples 2 through 4, wherein the phosphors are excited by light having a wavelength of 365 nm. Referring to FIG. 1, for the phosphors manufactured according to Examples 2, 3 and 4, as the relative amount of Mn (II) is increased with respect to Eu (II), the intensity of a red peak is increased and the intensity of a blue peak is reduced. While not wanting to be bound by theory, it is believed that this is because a red peak is formed due to Mn (II) substituted at Mg sites are affected by the same crystal fields and thus a 627 nm red emission peak also exists as a single peak.

Figure 6:
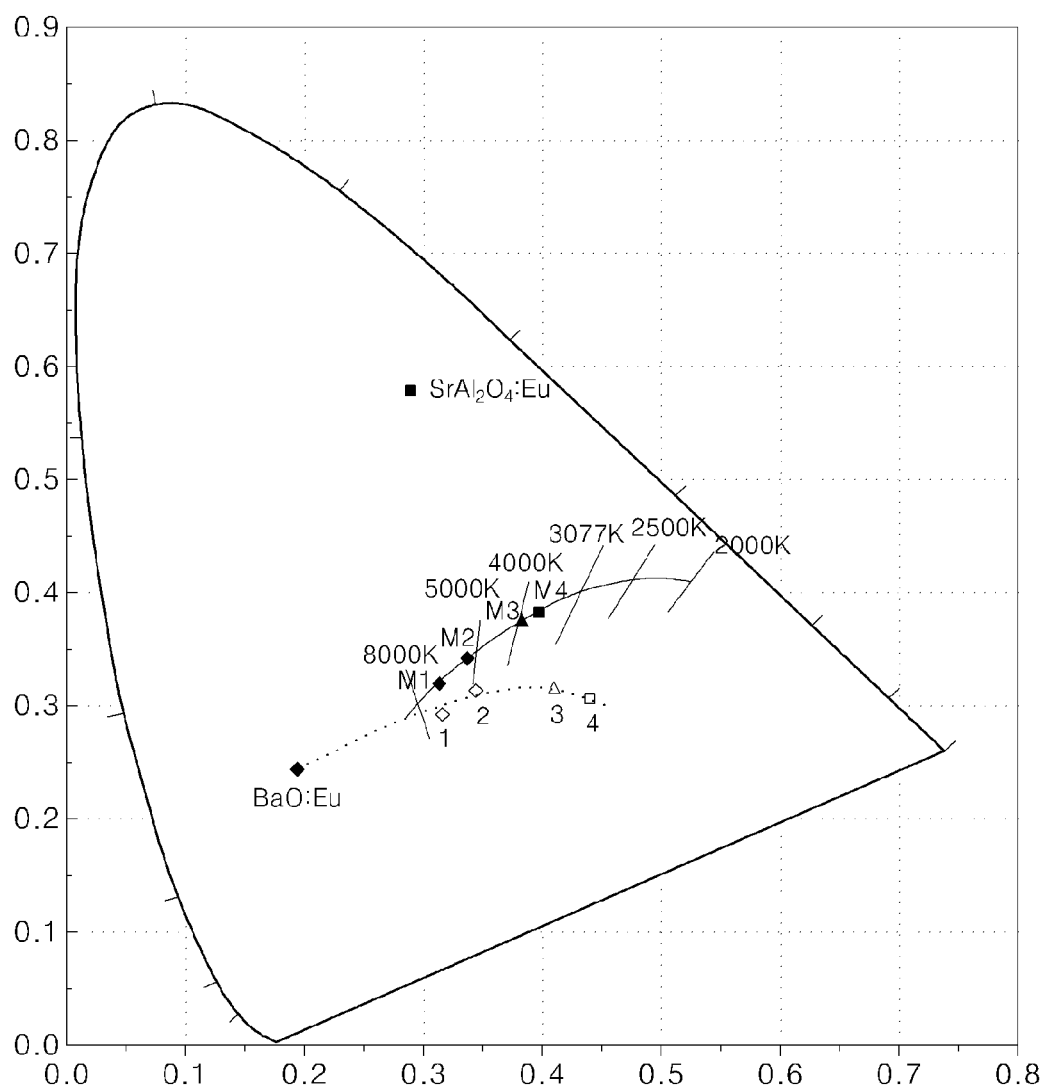
FIG. 6 is a graph of derived parameters x and y illustrating color coordinates of mixed spectra obtained by mixing the spectra of the phosphors manufactured in accordance with Examples 1 to 4 and the Comparative Example and the spectra of a $SrAl_2O_4$:Eu (II) phosphor.

The PL spectra of the phosphors manufactured according to Examples 1 to 4 were mixed with a $SrAl_2O_4$:Eu phosphor (M1, M2, M3, and M4), color coordinates of the respective mixed spectra were measured and a white luminescence device including a phosphor mixture was evaluated using a Color Rendering Index ("CRI") simulator. The simulation results are shown in Table 2 below and in FIGS. 5A through 5D. FIGS. 5A through 5D show mixed simulation spectra obtained by mixing the PL spectra of the phosphors manufactured according to Examples 1 to 4 and the PL spectrum of the SrAl$_2$O$_4$:Eu phosphor. FIG. 6 shows color coordinates of mixed spectra obtained by mixing the spectra of the phosphors manufactured according to Examples 1 to 4, the Comparative Example and the spectra of the phosphors M1, M2, M3 and M4, which emit green light.

Referring to Table 2 and FIGS. 5 and 6, the phosphors manufactured according to Examples 1 and 2 are single phosphors, have white luminescence and their CRI values are 77, thus they have a CRI value that is equivalent to that of a three-color fluorescent lamp. When green, which was the color the phosphors lacked, was added, a white light source having the color temperature of about 3000 K to about 8000 K and CRI of 90 or less was manufactured.

TABLE 2

| | | Sample | | | | | | | |
|---|---|---|---|---|---|---|---|---|---|
| | | Comparative Example 1 | Example 1 | M1 | Example 2 | M2 | Example 3 | M3 | Example 4 | M4 |
| CRI (Calculated) | | 77 | 89 | 77 | 89 | 71 | 90 | 63 | 87 |
| CIE Color Coordinate | x | 0.1934 | 0.3157 | 0.3134 | 0.3432 | 0.3376 | 0.4097 | 0.3823 | 0.4413 | 0.3991 |
| | y | 0.2460 | 0.2959 | 0.3225 | 0.3154 | 0.3437 | 0.3201 | 0.3804 | 0.3092 | 0.3855 |

"CIE" refers to the International Commission on Illumination.

As described above, a phosphor according to an embodiment has a wide emission peak in a visible wavelength region. Thus, when used alone or together with a small amount of a green phosphor, a white light having a high CRI can be realized. In addition, quality control is facilitated and thus, the derivatives of color coordinates of a white light source can be reduced. Furthermore, when a phosphor is synthesized, a ratio of blue light to red light can be controlled by using the same source material and adjusting the amount of Eu (II) and Mn (II), which are activators. Also, since two colors are embodied in the same compound, a phosphor can be synthesized with reduced facility costs, reduced production costs and reduced source material costs, and a light emitting device may be manufactured with reduced source material costs.

A phosphor according to an embodiment has a wide emission peak in a visible wavelength region. Thus, when used alone or together with a small amount of a green phosphor, a white light having a high CRI may be provided.

It should be understood that the exemplary embodiments described therein should be considered in a descriptive sense only and not for purposes of limitation. Descriptions of features, advantages or aspects within each embodiment should be considered as available for other similar features, advantages or aspects in other embodiments.

What is claimed is:

1. A white light emitting device comprising:
a light emitting diode; and
a phosphor represented by Formula 1:

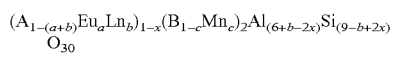

Formula 1 wherein A comprises at least one element selected from the group consisting of Ca, Sr and Ba,
Ln comprises at least one metal selected from the group consisting of a trivalent rare earth metal,
B comprises at least one element selected from the group consisting of Mg, Zn, Ge and Co, and
a is greater than 0 and equal to or less than about 0.5, b is 0 to about 0.25, c is greater than 0 and less than about 0.8, and x is 0 to about 0.2.

2. The white light emitting device of claim 1, wherein the phosphor has an osumilite-type crystal structure.

3. The white light emitting device of claim 1, wherein a 6-coordinate ionic radius of B is about 0.75 Å to about 0.95 Å.

4. The white light emitting device of claim 1, wherein when excited, the phosphor has an emission wavelength of about 460 to about 630 nanometers.

5. The white light emitting device of claim 1, wherein the phosphor has at least two emission peaks.

6. The white light emitting device of claim 5, wherein the emission peaks are between a red wavelength region and a blue wavelength region.

7. The white light emitting device of claim 6, wherein the quantity $$I_b/(I_b+I_r)$$

is greater than or equal to about 0.1 and less than or equal to about 0.9, wherein $I_b$ represents a blue light maximum peak intensity and $I_r$ represents a red light maximum peak intensity.

8. The white light emitting device of claim 1, wherein the light emitting diode comprises an ultraviolet light emitting diode.

9. The white light emitting device of claim 1, further comprising a green phosphor having an emission peak at a wavelength of about 500 to about 600 nanometers.

10. The white light emitting device of claim 3, wherein the green phosphor comprises at least one phosphor selected from the group consisting of (Ba,Sr,Ca)$_2$SiO$_4$:Eu$^{2+}$; Ba$_2$MgSi$_2$O$_7$:Eu$^{2+}$; Ba$_2$ZnSi$_2$O$_7$:Eu$^{2+}$; BaAl$_2$O$_4$:Eu$^{2+}$; SrAl$_2$O$_4$:Eu$^{2+}$; BaMgAl$_{10}$O$_{17}$:Eu$^{2+}$, Mn$^{2+}$ and BaMg$_2$Al$_{16}$O$_{27}$:Eu$^{2+}$, Mn$^{2+}$.

11. The white light emitting device of claim 1, wherein the white light emitting device is a traffic light, a light source for a communications device, a backlight of a display device or an illumination source.

* * * * *